United States Patent Office 3,351,673
Patented Nov. 7, 1967

3,351,673
PROCESS FOR PREPARING COMPOSITE
EPOXIDE RESINS
Herbert P. Price, Louisville, Ky., assignor to Celanese
Coatings Company, a corporation of Delaware
No Drawing. Filed Aug. 2, 1965, Ser. No. 476,702
4 Claims. (Cl. 260—830)

This invention relates to a process for preparing composite epoxide resins. Particularly, this invention pertains to a process for preparing polyepoxide compositions which are mixtures of glycidyl derivatives of cyanuric acid and different polyepoxide compounds. The composite epoxide resins produced by the process of this invention can be further reacted with conventional epoxide resin curing agents to form cross-linked products which are useful as protective and decorative coatings, moldings, adhesives and the like.

In U.S. Patent 2,864,805 a process is described for preparing epoxide resins from a mixture of cyanuric acid and a polyhydric phenol by a two-stage process. The cyanuric acid and the polyhydric phenol are first reacted with epichlorohydrin in the presence of a catalyst to form polychlorohydrin derivatives which are then subjected to dehydrohalogenation to form epoxide resins.

In conducting the process of this invention, cyanuric acid is reacted in an excess of epichlorohydrin with an organic base as catalyst to form the trichlorohydrin derivative of cyanuric acid. A polyepoxide compound containing more than one vicinal epoxy group per molecule and containing no triazine ring structure is then dissolved in the resulting solution. Upon subsequent reaction with caustic, the trichlorohydrin derivative of cyanuric acid is dehydrohalogenated to form triglycidyl isocyanurate, in admixture with the polyepoxide compound. The resulting compositions have excellent compatibility, high epoxide content and low chlorine content.

In U.S. Patent 2,864,805 the cyanuric acid and polyhydric phenol are both reacted with epichlorohydrin in the first stage of the reaction. After dehydrohalogenation in the second stage, composite epoxide resins are produced which are glycidyl derivates of cyanuric acid and the polyhydric phenol.

In the process of this invention, only cyanuric acid is reacted with epichlorohydrin in the first stage. Less epichlorohydrin is therefore required for the reaction. Interaction in the first stage between the cyanuric acid and its derivatives with the polyhydric phenol and its derivates is eliminated leading to the production of purer products.

Polyepoxide compounds are added before the dehydrohalogenation step. The composite products, which result after dehydrohalogenation, are not limited to mixtures of glycidyl derivatives of cyanuric acid and polyhydric phenols but include a wide variety of polyepoxide compounds as hereinafter set forth. Less caustic is required in the dehydrohalogenation step since only the chlorohydrin derivatives of cyanuric acid are dehydrohalogenated.

In the first step of this process, cyanuric acid is reacted with epichlorohydrin in an excess of epichlorohydrin using an organic base as catalyst to form the trichlorohydrin isocyanurate. Cyanuric acid is substantially insoluble in epichlorohydrin. However, when cyanuric acid and epichlorohydrin are heated with agitation in the presence of an organic basic catalyst, the cyanuric acid gradually dissolves in the epichlorohydrin and at the same time reacts with the epichlorohydrin to form soluble trichlorohydrin derivatives of cyanuric acid.

The epichlorohydrin used in the process of this invention serves as a reactant and as a solvent. Part of the epichlorohydrin reacts with the cyanuric acid under the organic base catalysis and the remainder serves as a solvent for the reactants, the polyepoxide compound and the reaction product. Cyanuric acid is trifunctional and will react with three mols of epichlorohydrin. However, when only three moles of epichlorohydrin per mole of cyanuric acid are used, considerable amounts of polymeric and complex products result due to the interaction of cyanuric acid with the epichlorohydrin-cyanuric acid reaction product. In order to obtain products which are largely monomeric, an excess of epichlorohydrin should be used. As the excess of epichlorohydrin is increased, the amount of polymeric product is decreased. In conducting the first stage of this reaction, it is preferred to use at least about six mols of epichlorohydrin for each mol of cyanuric acid, or as expressed in equivalents, at least about two mols of epichlorohydrin per active hydrogen equivalent of the cyanuric acid. Higher ratios of epichlorohydrin can be used in order to obtain more monomeric products and to have a reaction medium of handable viscosity. However, since the unreacted epichlorohydrin should be recovered for economic reasons, it is preferred to use from about six to about fifteen mols of epichlorohydrin for each mol of cyanuric acid.

The catalysts used in the reaction of cyanuric acid and epichlorohydrin are organic basic catalysts which include tertiary amines, such as triethyl amine, tripropyl amine, tributyl amine, trimethyl aniline, benzyl dimethyl amine, etc., and quarternary ammonium compounds such as benzyl trimethyl ammonium hydroxide, benzyl trimethyl ammonium chloride, benzyl trimethyl ammonium methoxide, trimethyl ammonium bromide as well as quaternary ammonium ion-exchange resins and the like. These catalysts are utilized in catalytic quantity which can vary from about 0.05 to about 5 weight percent based upon the weight of the cyanuric acid.

As has been stated hereinbefore, cyanuric acid is substantially insoluble in epichlorohydrin, but when the two components are used with a catalyst, the cyanuric acid gradually reacts with the epichlorohydrin and dissolves in the epichlorohydrin forming a solution of the trichlorohydrin derivative of cyanuric acid in epichlorohydrin. The extent of reaction can be followed by the dissolution of cyanuric acid. When the cyanuric acid is all dissolved, the formation of the trichlorohydrin derivative is substantially complete.

The reaction of cyanuric acid and epichlorohydrin is conducted at elevated temperatures in the range of about 60° C. to about 120° C. for a time sufficient to complete the reaction, generally about 30 minutes to about 3 hours.

After the reaction of cyanuric acid and epichlorohydrin is completed, a polyepoxide compound which contains no triazine ring structure, i.e., a compound which is not a derivative of cyanuric acid, is added to and dissolved in the solution of trichlorohydrin derivative of the cyanuric acid and epichlorohydrin followed by reaction with caustic to dehydrohalogenate the cyanuric acid derivative, thus forming triglycidyl isocyanurate in admixture with the polyepoxide compound.

A wide variety of polyepoxide compounds can be used in the practice of this invention. The useful polyepoxide compounds are those having more than one vicinal epoxide group per molecule. They can be saturated or unsaturated, aliphatic, cycloaliphatic, aromatic or heterocyclic. They can be monomeric or polymeric in nature.

Particularly useful polyepoxide compounds for use in the process of this invention are the glycidyl ethers of polyhydric phenols obtained by reacting a polyhydric phenol in an excess of epichlorohydrin with sodium hydroxide. Such polyhydric phenols include Bisphenol A (p,p'-dihydroxydiphenyl propane), resorcinol, hydroquinone, 4,4' - dihydroxybenzophenone, bis - 4 - hydroxyphenyl ethane, 1,5 - dihydroxynaphthalene, 4,4' - dihydroxy biphenyl, novolak resins containing more than 2 phenol moieties linked through methylene bridges and the like.

Other polyepoxide compounds are polymers prepared by reacting 1.2 up to about 2 mols of epichlorohydrin with 1 mol of a dihydric phenol or by reacting diepoxides with added dihydric phenol.

Additional polyepoxide compounds include epoxidized hydrocarbons such as vinyl cyclohexene dioxide, butadiene dioxide, dicyclopentadiene dioxide, epoxidized polybutadiene and limonene dioxide. Other epoxide compounds are epoxidized esters, for example, epoxidized soybean oil, epoxidized glycerol trilinoleate and 3,4-epoxy-6-methylcyclohexylmethyl-3,4-epoxy-6-methylcyclohexane carboxylate. Still other epoxides are polymers and copolymers of vinyl polymerizable monoepoxides such monoepoxides being allyl glycidyl ether, glycidyl acrylate and glycidyl methacrylate.

Polyepoxide compounds useful in this invention also include polyglycidyl ethers of polyhydric alcohols made by reacting a polyhydric alcohol in epichlorohydrin with acidic catalyst such as boron trifluoride, and subsequently treating the resulting product with an alkaline material. Included among the polyhydric alcohols that can be used in the preparation of these polyepoxides are glycerine, ethylene glycol, propylene glycol, diethylene glycol, hexanetriol, pentaerythritol, trimethylol ethane, trimethylol propane, etc. In addition, polyhydric ether alcohols, for instance, diglycerol, dipentaerythritol, polyalkylene glycols and hydroxyalkyl ethers of the aforementioned polyhydric phenols can be used.

Also included among the polyepoxide compounds useful in this invention are glycidyl esters of polycarboxylic acids such acids being azelaic acid, terephthalic acid, dimerized and trimerized unsaturated fatty acids, etc.

Other suitable polyepoxide compounds are disclosed in the book "Epoxy Resins," by Lee and Neville, McGraw-Hill Book Company, 1957.

The amount of epoxide compound that can be added to the solution of trichlorohydrin derivative of cyanuric acid and epichlorohydrin can be varied quite widely. This amount of epoxide compound can be expressed as a weight ratio of epoxide compound to cyanuric acid originally present. Generally, this ratio is about 5 to about 95 parts of epoxide compound to 95 to 5 parts, the total being 100, of cyanuric acid with the preferred ratios being about 25 to about 75 parts of epoxide compound to 75 to 25 parts of cyanuric acid.

The second stage or dehydrohalogenation step of this process is conducted using an alkali metal hydroxide. Although lithium hydroxide can be used, the preferred hydroxides are sodium or potassium hydroxide. The amount of hydroxide added is substantially equivalent to the active hydrogen content of the cyanuric acid originally present. The alkali metal hydroxide is added incrementally as solid flakes of pellets or as a dispersion in an inert solvent such as aromatic hydrocarbons or ketones, the rate of addition being governed by the heat generated in the reaction. The dehydrohalogenation reaction is carried out at a temperature below 120° C. and preferably in the range of about 40° C. to about 100° C.

As has been stated hereinbefore, at least about two mols of epichlorohydrin per active hydrogen are required in the initial reaction. The excess or unreacted epichlorohydrin serves as a solvent for the second or dehydrohalogenation stage. When large proportions of polyepoxide compound are added prior to dehydrohalogenation, additional epichlorohydrin or an inert solvent such as aromatic hydrocarbons (benzene, toluene, xylene, etc.) or ketones (acetone, methylethyl ketone, methylisobutyl ketone, etc.) can be added. Such additional solvents reduce the viscosity of the solution and facilitate the mixing of alkali metal hydroxide during the dehydrohalogenation reaction.

After the dehydrohalogenation reaction is completed, the composite epoxide containing product is recovered by removing the salt formed in the reaction by filtration, extraction or centrifugation and by distilling off the unreacted epichlorohydrin and other solvents if used.

The invention is further illustrated by the following examples, but it is understood that the invention is not limited thereto. In the examples, parts are by weight.

*Example 1*

To a suitable reaction flask equipped with a stirrer, thermometer, condenser and dropping funnel were added 43 parts of cyanuric acid, 720 parts of epichlorohydrin and 3 parts of a 60 percent aqueous solution of benzyl trimethyl ammonium chloride. Heat was applied raising the temperature to 114° C. Heating was continued for 1 hour and 5 minutes while the temperature rose slowly to 122° C. and the cyanuric acid dissolved in the epichlorohydrin. The heat source was removed and 114 parts of the diglycidyl ether of p,p'-dihydroxydiphenyl propane (epoxide equivalent weight 190) was dissolved in the solution. A caustic dispersion (42 parts sodium hydroxide, 63 parts xylene, and 0.42 part dimerized fatty acid) was added to the dropping funnel. The caustic dispersion was added to the reactants over a period of 32 minutes at a temperature of 49° C. to 53° C. The reactants were then heated to 122° C. while distilling off the water formed in the reaction along with epichlorohydrin. The salt formed in the reaction was removed by filtration and the epichlorohydrin was distilled off under a pressure of 5–10 mm. Hg to 114° C. 231 parts of product were recovered having an epoxide equivalent weight of 152 and a chlorine content of 2.0 percent.

*Example 2*

To a suitable reaction flask equipped as described in Example 1 were added 43 parts of cyanuric acid, 720 parts of epichlorohydrin and 3 parts of a 60 percent aqueous solution of benzyl trimethyl ammonium chloride. Heat was applied raising the temperature to 115° C. After heating for 1 hour and 5 minutes, the temperature had risen to 120° C. and all the cyanuric acid was dissolved. The heat source was removed and 114 parts of a diglycidyl ether of p,p'-dihydroxydiphenyl propane (epoxide equivalent weight 190) were dissolved in the solution. A caustic dispersion (42 parts sodium hydroxide, 63 parts xylene and 0.42 part dimerized fatty acid) was added to the dropping funnel. The caustic dispersion was added to the reactants over a period of 30 minutes at a temperature of 52° C. to 53° C. The water of reaction along with epichlorohydrin was removed by distillation to a flask temperature of 122° C. The salt was removed by filtration and the epichlorohydrin was distilled off to a flask temperature of 110° C. under 5–10 mm. Hg pressure. The reaction product was dissolved in 200 parts of methyl ethyl ketone, and 4.2 parts of sodium hydroxide dispersed in 6.3 parts of xylene with 0.04 part of dimerized fatty acids were added to the solution at a temperature of 51° C. Heat was applied to the flask raising the temperature to 89° C. while removing the water formed in the reaction. The salts were removed by filtration and the solvents were vacuum distilled to a flask temperature of 108° C. under 5–10 mm. Hg pressure. 214 parts of product were recovered having an epoxide equivalent weight of 149 and a chlorine content of 1 percent.

*Example 3*

Using the same procedure as was described in Example 2, 43 parts of cyanuric acid and 720 parts of epichlorohydrin were reacted using 3 parts of a 60 percent aqueous solution of benzyl trimethyl ammonium chloride as catalyst. To the resulting trichlorohydrin derivative of cyanuric acid solution in epichlorohydrin were dissolved 114 parts of a diglycidyl ether of p,p'-dihydroxydiphenyl propane (epoxide equivalent 190). 42 parts of flake sodium hydroxide were added to the solution over a period of one hour and four minutes while keeping the temperature at 46° C. to 50° C. The temperature was then raised to 121° C. to remove the water formed in the reaction. The salt formed in the reaction was removed by filtration and the epichlorohydrin was removed by distillation to a flask temperature of 104° C. under 5–10 mm. Hg pressure. The resulting product was dissolved in 200 parts of methyl ethyl ketone and was reacted with 4.2 parts of flake caustic at a temperature of 50° C. to 59° C. After removal of the salt and solvent, 217 parts of product were obtained having an epoxide equivalent weight of 151.

The resulting composite epoxide resins cure to hard infusible castings and films when reacted with polyamines, such as ethylene diamine, diethylene triamine, tetraethylene pentamine and imino-bis-propylamine, anhydrides, such as phthalic anhydride, hexahydrophthalic anhydride and dodecenylsuccinic anhydride, and other epoxy resin curing agents as disclosed in "Epoxy Resins," by Lee and Neville, McGraw-Hill Book Company, 1957.

It is to be understood that the foregoing detailed description is given merely by way of illustration and that many variations may be made therein without departing from the spirit of the invention.

The embodiments of the invention in which an exclusive property or privilege is claimed are defined as follows:

1. A process for preparing composite epoxide resins which comprises reacting cyanuric acid in an excess of epichlorohydrin using an organic base as catalyst to form polychlorohydrin derivatives of cyanuric acid, adding to and dissolving therein a polyepoxide compound containing more than one vicinal epoxy group per molecule and being free from the triazine ring structure and reacting the resulting solution with an alkali metal hydroxide wherein the epichlorohydrin is present in the amount of at least about 2 mols per active hydrogen equivalent of the cyanuric acid and wherein the amount of alkali metal hydroxide used is substantially equivalent to the active hydrogens of the cyanuric acid originally present to form a composite epoxide resin of polyglycidyl isocyanurate and the polyepoxide compound.

2. The process of claim 1 wherein the weight ratio of cyanuric acid originally present to added polyepoxide compound is 5 to 95 parts of cyanuric acid to 95 to 5 parts of polyepoxide compound, the total parts being 100.

3. The process of claim 1 wherein the alkali metal hydroxide is sodium hydroxide and the polyepoxide compound is the diglycidyl ether of p,p′-dihydroxydiphenyl propane.

4. The process of claim 1 wherein the polyepoxide compound is 3,4-epoxy-6-methylcyclohexylmethyl-3,4-epoxy-6-methylcyclohexane carboxylate.

References Cited
UNITED STATES PATENTS

| | | | |
|---|---|---|---|
| 2,864,805 | 12/1958 | Cooke | 260—47 |
| 2,893,978 | 7/1959 | Cooke | 260—47 |

WILLIAM H. SHORT, *Primary Examiner.*

T. D. KERWIN, *Assistant Examiner.*